Patented Sept. 28, 1954

2,690,452

UNITED STATES PATENT OFFICE 2,690,452

CATALYTIC DEHYDRATION OF ETHYLENE CYANOHYDRIN TO ACRYLONITRILE

Erwin L. Carpenter, Stamford, Conn., assignor to American Cyanamid Company, New York, N. Y., a corporation of Maine No Drawing. Application July 7, 1951,
Serial No. 235,667

7 Claims. (Cl. 260—465.9)

The present invention relates to the production of acrylonitrile. More specifically, the present invention relates to a process for the catalytic dehydration of ethylene cyanohydrin to acrylonitrile in the presence of novel dehydrating catalyst compositions comprising sodium formate and an inert material in particulate form.

Acrylonitrile has been produced industrially for a number of years by a process wherein a stream of liquid ethylene cyanohydrin is fed into a volume of a dehydrating catalyst in a dehydration zone maintained at a critical temperature which varies for each catalyst but which usually is in the range 160°–240° C. Water, acrylonitrile and some unreacted ethylene cyanohydrin are volatilized from the catalyst and pass into a fractionating column which condenses and returns undehydrated cyanohydrin. The acrylonitrile and water formed by the dehydration are discharged from the column and condense to a stratifiable distillate from which the acrylonitrile is readily recovered.

For this dehydration, the raw material may be the raw or "crude" cyanohydrin as received from the reaction of equimolecular proportions of ethylene oxide with hydrocyanic acid, or a substantially pure ethylene cyanohydrin, hereinafter called "distilled" cyanohydrin may be used. The former or crude material contains about 5% to 10% of water or more, and about 2% to 6% of dark polymers or residues of unknown composition from the reaction which boil at temperatures above the boiling point of ethylene cyanohydrin, that is, above about 220° C. The latter or distilled cyanohydrin contains practically none of this dark material and about 1% to 2% of water.

Intensive study has developed several organic salt catalysts which, under laboratory trials with distilled ethylene cyanohydrin have realized very high yields of acrylonitrile. Catalysts of this class are disclosed in U. S. Patent 2,461,492 and the present invention is an improvement over Example 4 thereof.

The improved results obtained by the use of sodium formate as set forth in the patent referred to have been attended by a number of disadvantages. In the first place, it was found that the effectiveness of this catalyst, under certain conditions, falls with undue rapidity during the last half of its normal life. This variable activity is a function both of the temperature at which the dehydration is conducted, and of the purity of the ethylene cyanohydrin as well. For example, when distilled ethylene cyanohydrin is employed and the dehydration reaction is performed at the temperature of 205° C. found optimum for this material, the above-noted reduction in yield is small and in fact almost unnoticeable, running only a percent or two. Excellent over-all yields are therefore obtained. When, however, crude ethylene cyanohydrin is employed as the raw material and is dehydrated at that temperature, or when distilled cyanohydrin is dehydrated at temperatures of 195° C. or lower, the above-noted falling-off in yield becomes very evident, the difference in yields between the first half and the last half of the run being often 10% and not infrequently more. This decrease in yield is accompanied by a correspondingly increased formation of dark high boiling polymers or derivatives of ethylene cyanohydrin. These dark, high boiling products are valueless and normally are sent to waste.

Another important disadvantage resides in the fact that the dark, high-boiling polymers or residues which crude ethylene cyanohydrin contains were found to have a deleterious effect both upon the yield of acrylonitrile and upon the life of the sodium formate catalyst. This particular difficulty was obviated by subjecting the crude ethylene cyanohydrin to a vacuum distillation which removed practically all the dark material. However, it was apparent that this distillation was an expedient, and that it would be preferable to discover a new catalyst composition suitable for the purpose.

The discovery has now been made that the addition of inert material in particulate form markedly lengthens the activity of the catalyst during the last half of its life, not merely when a pure or distilled ethylene cyanohydrin is used, but when a crude ethylene cyanohydrin containing the above-noted dark residues is used as well. In addition, the very surprising discovery has been made that the presence of this inert material reduces, often by more than ⅓, the amount of sodium formate decomposed per mol of acrylonitrile produced, and permits dehydration of crude ethylene cyanohydrin at 195° C. with substantially the same yields as are obtained when distilled ethylene cyanohydrin is dehydrated at 205° C., and with satisfactory catalyst lives.

The particles present in the dehydration zone may be of any inert material. Typical materials suitable for this purpose are porcelain, chinaware, glass, sand, silicon carbide, aluminum, kaolin, bentonite, tantalum, tungsten carbide, aluminum alloys such as 3S aluminum (98.8% Al, 1.2% Mn), high nickel alloys such as Hastelloy B (33% Mo, 7% Fe, and 60% Ni), and hard polytetrafluoroethylene. In addition, inert salts may be used, which may be water-soluble or water-insoluble. As typical salts there may be employed basic aluminum acetate, aluminum hydroxide, magnesium sulfate, sodium sulfate, monosodium phosphate, sodium chloride, magnesium chloride, and aluminum sulfate. Of all of these materials, metallic aluminum, magnesium sulfate, sodium sulfate, and aluminum sulfate are preferred. The size of the particles is not critical, particles ranging from the semi-colloidal, such as aluminum hydroxide particles, to particles as large as ¼" having been employed with good results.

The proportion of particulate material which should be present in the catalyst is not at all critical. Improved results are obtained when as little as 1% solids (anhydrous basis) are present based on the weight of the sodium formate. The maximum proportion of the particles which may be present is determined by the catalyst circulating means provided. In general an amount equal to roughly 10% of the weight of the sodium formate is satisfactory and more than 20% is usually difficult to handle.

It is an advantage of the present invention that it does not involve any new techniques or equipment, and that substantially the same operating procedure may be followed as when sodium formate alone is employed. For best results an anti-forming agent should be present, for example, one of those mentioned in U. S. Patent 2,494,116. The dehydration proceeds well over the temperature range 170°–210° C., and preferably over the range of 195° C.–205° C.

The following examples of preferred embodiments illustrate, but do not limit, the present invention, which has been set forth above.

*Examples 1–10*

A series of comparative laboratory tests was made showing the effect of the addition of inert particulate matter in the dehydration of crude ethylene cyanohydrin ("CECH") to acrylonitrile ("AN").

The tests were made in a reaction flask equipped with a stirrer, dropping funnel and distillation column, the lower part of which served as a fractionating column and returned unchanged cyanohydrin to the catalyst. The flask was heated by means of a Wood's metal bath. The catalyst composition consisting of 50 g. of sodium formate, 10 g. of the monomethyl ether of tripropylene glycol (B. P. 231°–235° C.) foam inhibitor and, where indicated, the particulate matter, was placed in the flask and brought to the operating temperature of 205° C. During this heating, crude ethylene cyanohydrin was added dropwise at the uniform rate of 3.5 cc. per minute, until a total of 30 gram-mols of ethylene cyanohydrin had been added. A distillate of acrylonitrile and water was collected from the distillation column, which was analyzed for its acrylonitrile content. In each run a determination was made of the yield of acrylonitrile after the first 16 mols of cyanohydrin had been added, and also of the yield of acrylonitrile during the balance of the run. After each run the products and the catalyst were analyzed to determine the grams of sodium formate which had decomposed per gram-mol of ethylene cyanohydrin fed, and the ratio by weight of the acrylonitrile produced to the sodium formate taken.

| Ex. | Particles | | AN Yield, Percent | | | HCOONa Decomp. g./mol ECH Fed | Lb. AN Per lb. HCOONa |
|---|---|---|---|---|---|---|---|
| | Name | Gm. | 1[a] | 2[b] | Overall | | |
| 1 | None | | 94.6 | 83.1 | 90.8 | 1.58 | 28.9 |
| 2 | Hastalloy B | 10.0 | 97.3 | 93.6 | 95.4 | 1.35 | 30.4 |
| 3 | Na₂SO₄ | 4.4 | 97.3 | 94.1 | 96.2 | 1.33 | 30.6 |
| 4 | PTFE [c] | 5.0 | 96.8 | 92.5 | 95.3 | 1.42 | 30.4 |
| 5 | NaH₂PO₄ | 7.5 | 97.2 | 94.7 | 96.0 | 1.05 | 30.5 |
| 6 | Al₂(SO₄)₃.18H₂O | 5.0 | 98.4 | 95.4 | 97.1 | 0.92 | 30.9 |
| 7 | Al₂(SO₄)₃.18H₂O | 10.0 | 98.0 | 96.1 | 97.3 | 0.94 | 30.9 |
| 8 | Al₂(SO₄)₃.18H₂O / Al | 5.0 / 8.0 | 96.5 | 94.0 | 95.3 | 0.94 | 30.4 |
| 9 | BAA [d] | 5.0 | 96.1 | 87.4 | 92.7 | 1.15 | 29.5 |
| 10 | MgSO₄.7H₂O | 10.0 | 98.2 | 95.0 | 97.1 | 1.29 | 30.9 |

[a] After addition of 16 mols of ethylene cyanohydrin.
[b] During remaining portion of run.
[c] Polytetrafluoroethylene.
[d] Basic aluminum acetate.

*Examples 11–16*

The procedure of Examples 1–9 was repeated, using however a distilled ethylene cyanohydrin which was practically free from dark high boiling residues and which contained 1% water. In these runs the total amount of ethylene cyanohydrin reacted was increased from the 30 gram-mols reacted in Examples 1–9 to the higher values shown below, and the dehydration temperatures were 195° C. in each instance.

| Ex. | Catalyst Composition, Gm.[a] | | | ECH Fed[b] Amt. | Yield of Acrylonitrile, Percent | | | | | Lb. AN Per lb. HCOONa |
|---|---|---|---|---|---|---|---|---|---|---|
| | HCOONa | Particles | | | Intermediate[c] | | | | Over-all | |
| | | Name | Gm. | | | | | | | |
| 11 | 100 | None | | 49 | $\frac{0\text{-}17}{95.9}$ | $\frac{18\text{-}37}{97.9}$ | $\frac{38\text{-}49}{90.2}$ | | 95.3 | 24.7 |
| 12 | 100 | Al | 9 | 78 | $\frac{0\text{-}20}{96.2}$ | $\frac{21\text{-}39}{98.1}$ | $\frac{40\text{-}59}{97.2}$ | $\frac{60\text{-}78}{95.9}$ | 97.1 | 40.0 |
| 13 | 100 | Al$_2$O$_3$ | 5 | 60 | $\frac{0\text{-}18}{96.5}$ | $\frac{19\text{-}39}{98.3}$ | $\frac{40\text{-}60}{95.3}$ | | 96.6 | 30.5 |
| 14 | 50 | None | | 31 | $\frac{0\text{-}18}{95.9}$ | $\frac{19\text{-}31}{87.1}$ | | | 92.1 | 30.3 |
| 15 | 50 | S. steel[d] | 10 | 31 | $\frac{0\text{-}16}{95.9}$ | $\frac{17\text{-}31}{94.6}$ | | | 95.4 | 31.7 |
| 16 | 50 | Sand / Silica | 7.5 / 2.5 | 31 | $\frac{0\text{-}16}{95.7}$ | $\frac{17\text{-}31}{95.6}$ | | | 95.7 | 31.6 |

[a] Included 10% the monomethyl ether of tripropylene glycol (B. P. 231°–235° C.) as anti-foaming agent, based on weight of the sodium formate.
[b] Gram-mols.
[c] By gram-molar increments shown.
[d] No. 316 stainless steel.

I claim:

1. A method of producing acrylonitrile which includes feeding a liquid ethylene cyanohydrin in liquid phase into a dehydrating zone heated to a temperature within the range from about 170° C. to 210° C., said zone containing sodium formate as an ethylene cyanohydrin dehydration catalyst, and an inert solid material in particulate form, and removing acrylonitrile and water from said zone, the amount of said inert solid material relative to the sodium formate being between 1 to 10% by weight of the sodium formate and being sufficient to retard decomposition of the sodium formate during the dehydration of the cyanohydrin and to increase the yield of acrylonitrile obtainable with said catalyst.

2. A method according to claim 1 in which the solid material is sodium sulfate.

3. A method according to claim 1 in which the solid material is magnesium sulfate.

4. A method according to claim 1 wherein the solid material is aluminum sulfate.

5. A method according to claim 1 wherein the solid material is an aluminum alloy.

6. A method according to claim 1 wherein the solid material is monosodium phosphate.

7. A method according to claim 1 wherein the ethylene cyanohydrin is crude ethylene cyanohydrin.

References Cited in the file of this patent

UNITED STATES PATENTS

| Number | Name | Date |
|---|---|---|
| 2,436,774 | Nutting et al. | Feb. 24, 1948 |
| 2,461,492 | Carpenter et al. | Feb. 8, 1949 |
| 2,494,116 | Carpenter | Jan. 10, 1950 |
| 2,500,403 | Davis et al. | Mar. 14, 1950 |
| 2,503,710 | Bruson | Apr. 11, 1950 |